(12) United States Patent
Schirdewahn et al.

(10) Patent No.: US 11,765,311 B2
(45) Date of Patent: Sep. 19, 2023

(54) TRANSPORT MECHANISMS FOR VIDEO STREAM MERGING WITH OVERLAPPING VIDEO

(71) Applicant: Cisco Technology, Inc., San Jose, CA (US)

(72) Inventors: Jochen Christof Schirdewahn, Stabekk (NO); Deqiang Ye, Hangzhou (CN); Mayan Fei, Hangzhou (CN); Sijia Chen, Pleasanton, CA (US); Zhou Qiang, Hangzhou (CN); Rui Zhang, Pleasanton, CA (US); Paul Gareth Bright-Thomas, Wokingham (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/389,518

(22) Filed: Jul. 30, 2021

(65) Prior Publication Data
US 2023/0048296 A1  Feb. 16, 2023

(51) Int. Cl.
H04N 5/272 (2006.01)
H04N 19/70 (2014.01)
G06T 7/194 (2017.01)
H04L 65/75 (2022.01)
G06F 3/14 (2006.01)

(52) U.S. Cl.
CPC .......... *H04N 5/272* (2013.01); *G06F 3/1454* (2013.01); *G06T 7/194* (2017.01); *H04L 65/764* (2022.05); *H04N 19/70* (2014.11); *G06T 2207/10016* (2013.01)

(58) Field of Classification Search
USPC .............................................. 348/14.02–14.9
See application file for complete search history.

(56) References Cited

U.S. PATENT DOCUMENTS

| 9,013,536 B2 | 4/2015 | Zhu et al. |
| 9,584,814 B2 | 2/2017 | Socek et al. |
| 10,528,820 B2 | 1/2020 | Pham |
| 10,977,802 B2 | 4/2021 | Wilson et al. |
| 2005/0264648 A1* | 12/2005 | Ivashin ............... H04N 21/632 348/14.09 |

(Continued)

OTHER PUBLICATIONS

Sharma, Pulkit, "Computer Vision Tutorial: Implementing Mask R-CNN for Image Segmentation (with Python Code)", online: https://www.analyticsvidhya.com/blog/2019/07/computer-vision-implementing-mask-r-cnn-image-segmentation/, Jul. 22, 2019, 50 pages.

(Continued)

*Primary Examiner* — Maria El-Zoobi
(74) *Attorney, Agent, or Firm* — BEHMKE INNOVATION GROUP LLC; Kenneth J. Heywood; Jonathon P. Western

(57) ABSTRACT

In various embodiments, a device receives a first video stream of a video conference. The device receives a second video stream of the video conference. The second video stream includes an indicated location for video of the second video stream relative to video of the first video stream. The device merges the first video stream and the second video stream into an overlapped video having the video of the second video stream located at the indicated location relative to the video of the first video stream. The device provides the overlapped video for display.

18 Claims, 9 Drawing Sheets

(56) References Cited

U.S. PATENT DOCUMENTS

| | | | | |
|---|---|---|---|---|
| 2010/0158365 | A1* | 6/2010 | Ishida | G06T 7/194 382/300 |
| 2014/0072051 | A1* | 3/2014 | Wang | H04N 19/85 375/240.16 |
| 2017/0039867 | A1* | 2/2017 | Fieldman | G09B 7/00 |
| 2017/0244930 | A1* | 8/2017 | Faulkner | H04N 7/152 |
| 2021/0019892 | A1 | 1/2021 | Zhou et al. | |
| 2021/0112109 | A1* | 4/2021 | Lu | H04L 65/1069 |

OTHER PUBLICATIONS

Rosebrock, Adrian, "Mask R-CNN with OpenCV", online: https://www.pyimagesearch.com/2018/11/19/mask-r-cnn-with-opencv/, Nov. 19, 2018, 43 pages.

"High Efficiency Image File Format", online: https://en.wikipedia.org/wiki/High_Efficiency_Image_File_Format, Jun. 21, 2021, 9 pages, Wikimedia Foundation, Inc.

Warren, Tom, "Microsoft Teams' New Together Mode is Designed for Pandemic-Era Meetings", online: https://www.theverge.com/2020/7/8/21317526/microsoft-teams-together-mode-dynamic-view-new-features, Jul. 8, 2020, 5 pages.

Edwards, et al., "Deploy ML Models to Field-Programmable Gate Arrays (FPGAs) with Azure Machine Learning", online: https://docs.microsoft.com/en-us/azure/machine-learning/how-to-deploy-fpga-web-service, Sep. 24, 2020, 13 pages.

"Amazon EC2 F1 Instances", online: https://aws.amazon.com/ec2/instance-types/f1/, accessed Jun. 28, 2021, 21 pages.

"Advanced Video Coding", online: https://en.wikipedia.org/wiki/Advanced_Video_Coding, Jun. 15, 2021, 19 pages, Wikimedia Foundation, Inc.

"AV1", online: https://en.wikipedia.org/wiki/AV1, Jun. 25, 2021, 14 pages, Wikimedia Foundation, Inc.

"JBIG2", online: https://en.wikipedia.org/wiki/JBIG2, May 19, 2021, 4 pages, Wikimedia Foundation, Inc.

Carpenter, Mark, "2.2.7 Bitstream Info SEI Message", Apr. 7, 2021, 2 pages, Microsoft Docs.

Norkin, Andrey, "AV1 Decoder Model", online: https://norkin.org/research/av1_decoder_model/index.html, Jun. 24, 2020, 11 pages.

"Universally Unique Identifiers (UUIDs)", online: https://www.itu.int/en/ITU-T/asn1/Pages/UUID/uuids.aspx, accessed Jul. 9, 2021, 1 page, ITU.

"The Pexip Infinity Virtual Auditorium: Distance Learning and Remote Education Made Easy", online: https://www.youtube.com/watch?v=DHT6s1zlsDQ, accessed Jun. 28, 2021, 20 pages, Youtube.com.

"Better Meetings with Microsoft Teams", online: https://youtu.be/A1egcVkYrgw, accessed Jul. 29, 2021, 12 pages, YouTube.com.

\* cited by examiner

TRANSPORT MECHANISMS FOR VIDEO STREAM MERGING WITH OVERLAPPING VIDEO

TECHNICAL FIELD

The present disclosure relates generally to computer networks, and, more particularly, to transport mechanisms for video stream merging with overlapping video.

BACKGROUND

Collaboration equipment, such as video conferencing equipment found in meeting rooms, kiosks, and the like are becoming increasing ubiquitous in many settings. For instance, meeting rooms in different geographic locations may be equipped with collaboration equipment that enable meeting attendees to video conference with one another. Other participants may be able to join the video conference by executing a corresponding application on their personal devices, such as computers, mobile phones, or the like. Accordingly, a video conferencing service may aggregate multiple video streams, to allow the different participants to see one another.

Typically, users have limited control over their video streams during a video conference, which can create additional overhead for the system. For instance, the video conferencing service may allow users to apply a masking to their video feeds, to replace their physical backgrounds with different images (e.g., a participant working from home may instead appear to the other participants as being located on the beach). In other cases, if a user is the presenter of the videoconference, they may opt to share their screen with the other participants, in lieu of their camera feed. However, this is typically done in a binary manner whereby either the user or their electronic content is shown to the other participants of the video conference at any given time.

DESCRIPTION OF EXAMPLE EMBODIMENTS

Overview

Figure 1A:
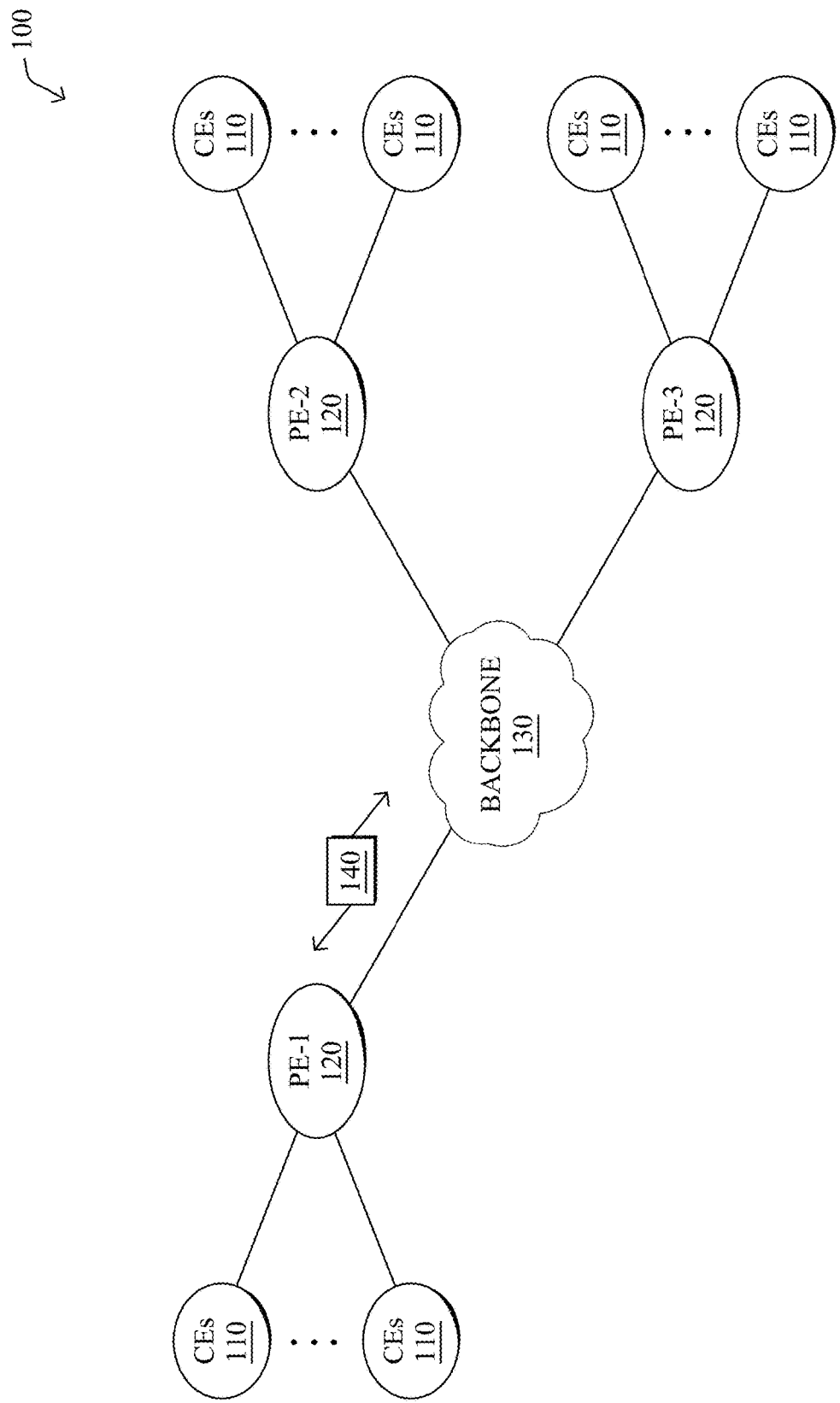
FIGS. 1A-1B illustrate an example communication network.

According to one or more embodiments of the disclosure, a device receives a first video stream of a video conference. The device receives a second video stream of the video conference. The second video stream includes an indicated location for video of the second video stream relative to video of the first video stream. The device merges the first video stream and the second video stream into an overlapped video having the video of the second video stream located at the indicated location relative to the video of the first video stream. The device provides the overlapped video for display.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
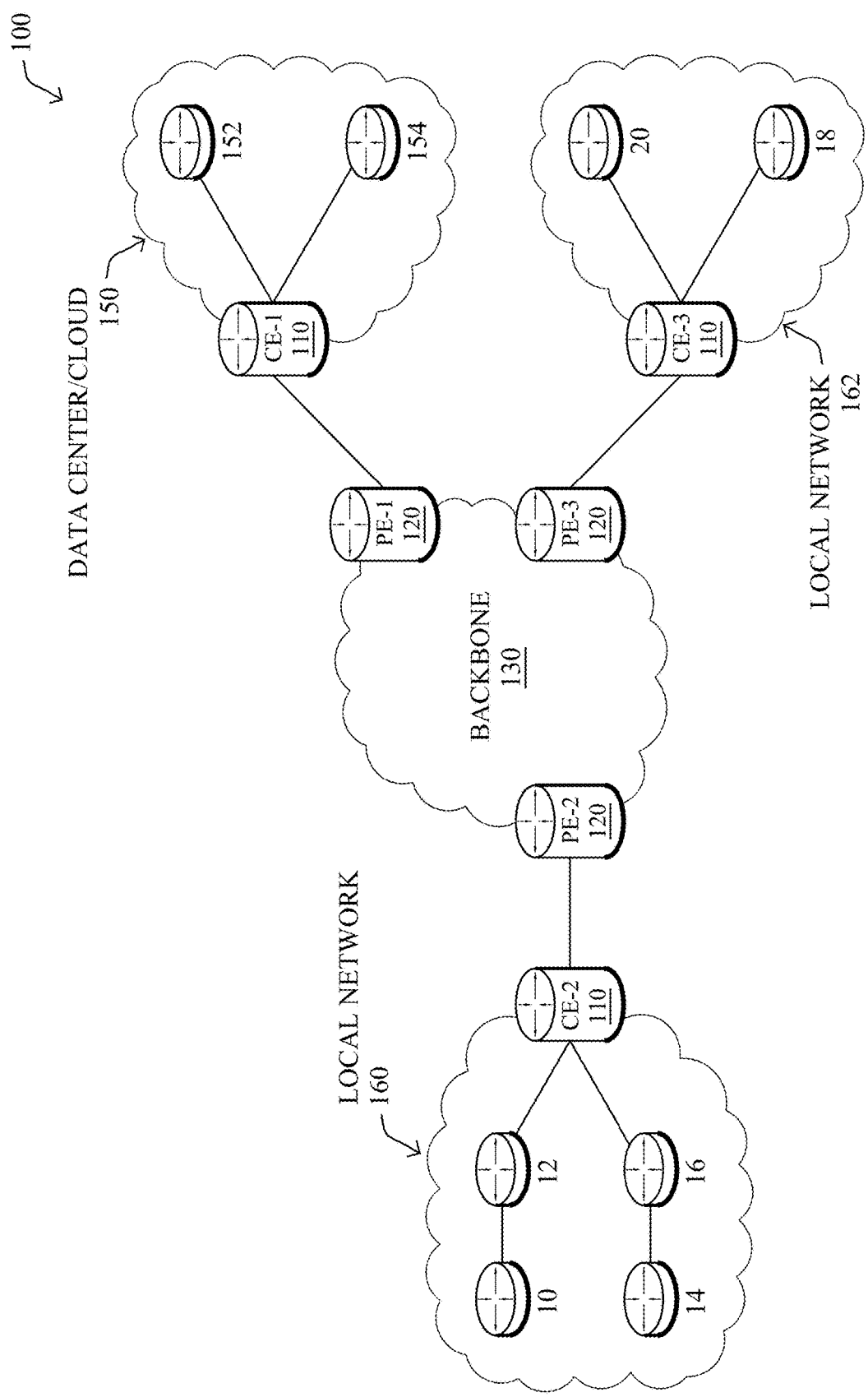

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, a server that provides a video conferencing/collaboration service (e.g., a management service), a server that provides a meeting scheduling service, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for devices/nodes 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
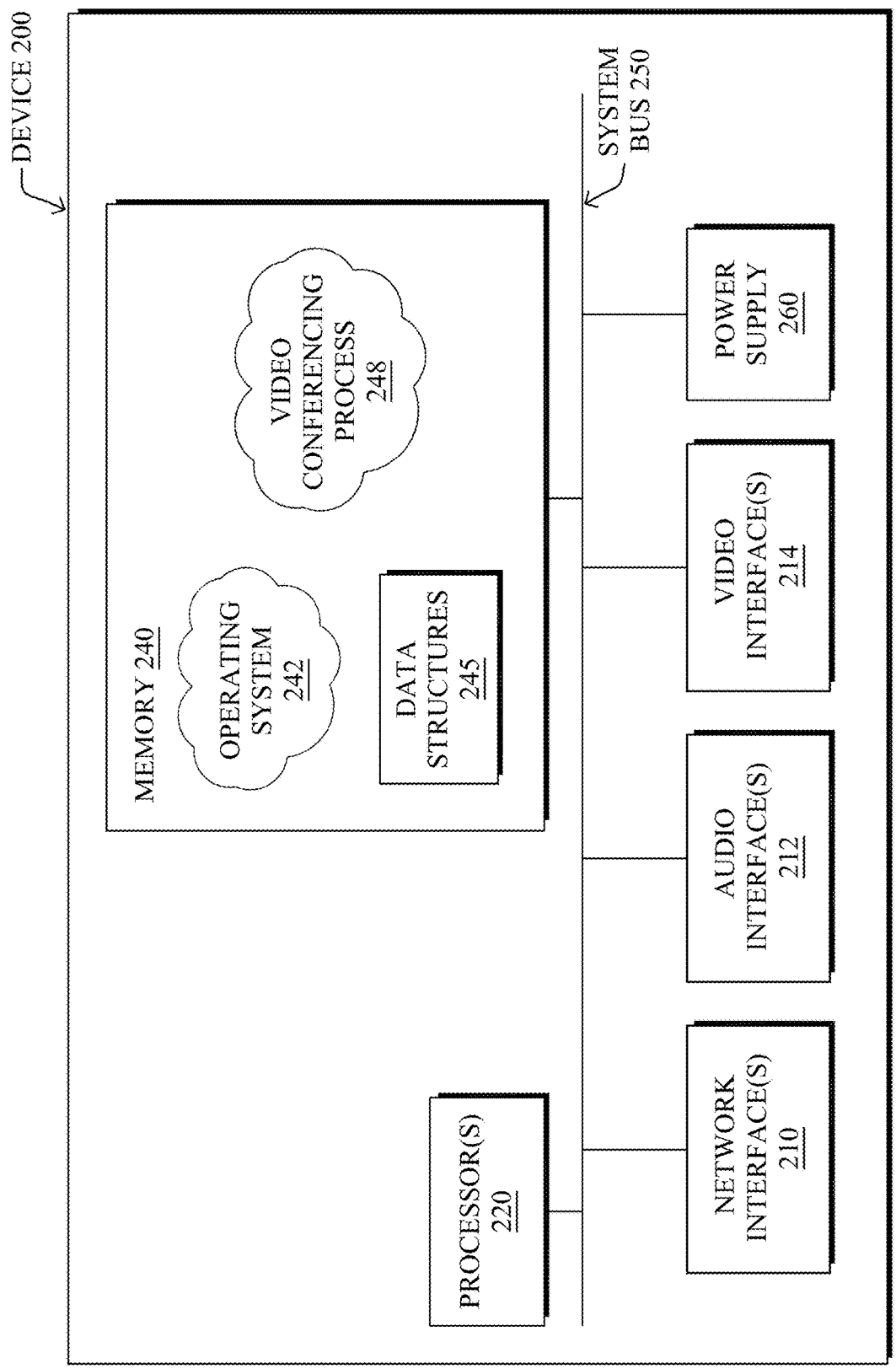
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below (e.g., a video conferencing/collaboration endpoint, a device that provides a management or booking service, etc.). The device 200 may also be any other suitable type of device depending upon the type of network architecture in place, such as IoT nodes, etc. Device 200 comprises one or more network interfaces 210, one or more audio interfaces 212, one or more video interfaces 214, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The audio interface(s) 212 may include the mechanical, electrical, and signaling circuitry for transmitting and/or receiving audio signals to and from the physical area in which device 200 is located. For instance, audio interface(s) 212 may include one or more speakers and associated circuitry to generate and transmit soundwaves. Similarly, audio interface(s) 212 may include one or more microphones and associated circuitry to capture and process soundwaves.

The video interface(s) 214 may include the mechanical, electrical, and signaling circuitry for displaying and/or capturing video signals. For instance, video interface(s) 214 may include one or more display screens. Preferably, at least one of the display screens is a touch screen, such as a resistive touchscreen, a capacitive touchscreen, an optical touchscreen, or other form of touchscreen display, to allow a user to interact with device 200. In addition, video interface(s) 214 may include one or more cameras, allowing device 200 to capture video of a user for transmission to a remote device via network interface(s) 210. Such cameras may be mechanically controlled, in some instances, to allow for repositioning of the camera, automatically.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a video conferencing process 248, as described herein, any of which may alternatively be located within individual network interfaces, the execution of which may cause device 200 to perform any or all of the functions described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

During execution, video conferencing process 248 may be configured to allow device 200 to participate in a video conference during which video data captured by video interface(s) 214 and, potentially, audio data captured by audio interface(s) 212 is exchanged with other participating devices of the video conference via network interface(s) 210. In addition, video conferencing process 248 may provide audio data and/or video data captured by other participating devices to a user via audio interface(s) 212 and/or video interface(s) 214, respectively. As would be appreciated, such an exchange of audio and/or video data may be facilitated by a video conferencing service (e.g., Webex by Cisco Systems, Inc., etc.) that may be hosted in a data center, the cloud, or the like.

Figure 3:
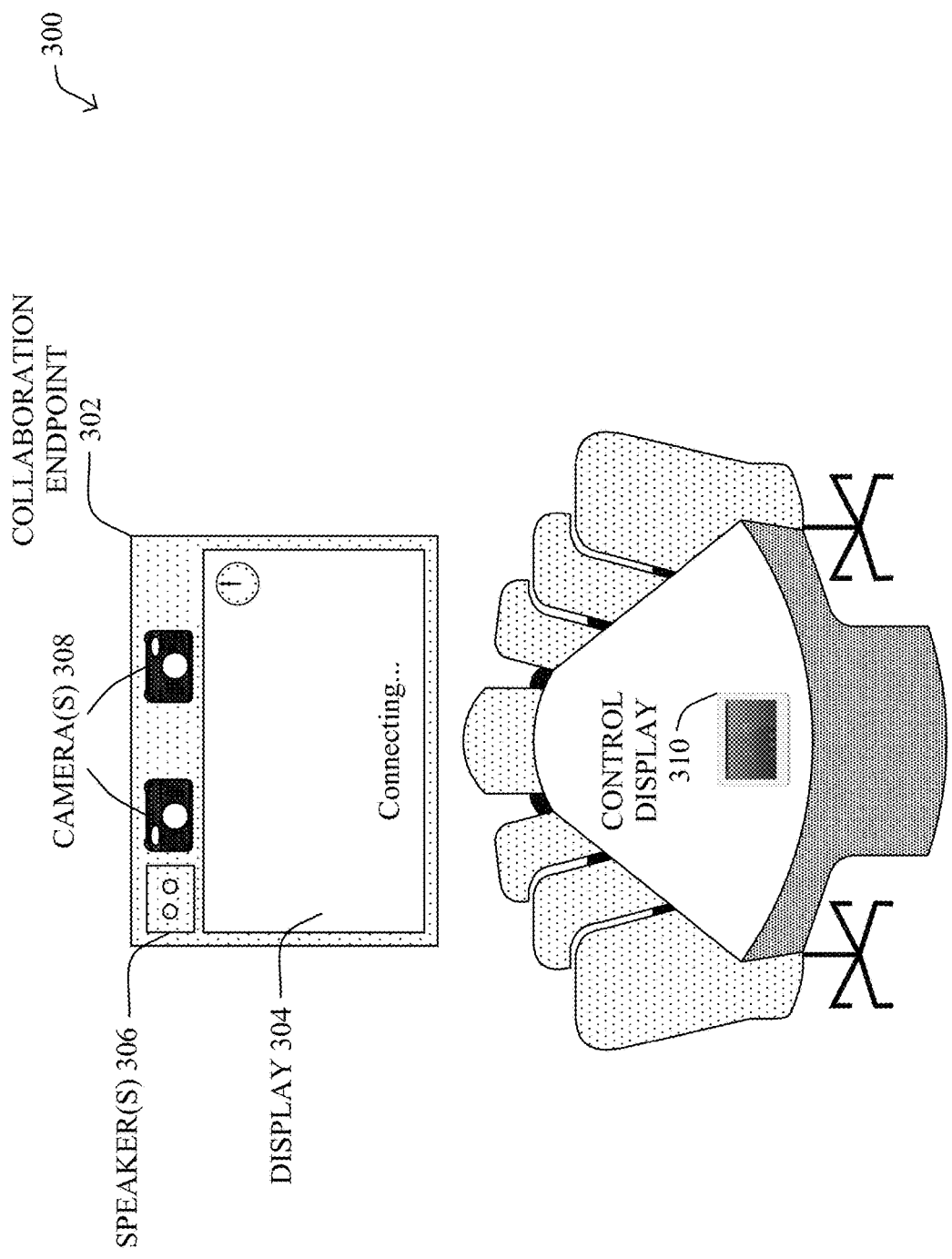
FIG. 3 illustrates various example components of a video conferencing system.

FIG. 3 illustrates an example meeting room 300 in which a collaboration endpoint 302 is located, according to various embodiments. During operation, collaboration endpoint 302 may capture video via its one or more cameras 308, audio via one or more microphones, and provide the captured audio and video to any number of remote locations (e.g., other collaboration endpoints) via a network. Such video conferencing may be achieved via a video conferencing/management service located in a particular data center or the cloud, which serves to broker connectivity between collaboration endpoint 302 and the other endpoints for a given meeting. For instance, the service may mix audio captured from different endpoints, video captured from different endpoints, etc., into a finalized set of audio and video data for presentation to the participants of a video conference. Accordingly, collaboration endpoint 302 may also include a display 304 and/or speakers 306, to present such data to any video conference participants located in meeting room 300.

Also as shown, a control display 310 may also be installed in meeting room 300 that allows a user to provide control commands for collaboration endpoint 302. For instance, control display 310 may be a touch screen display that allows a user to start a video conference, make configuration changes for the video conference or collaboration endpoint 302 (e.g., enabling or disabling a mute option, adjusting the volume, etc.

In some cases, any of the functionalities of collaboration endpoint 302, such as capturing audio and video for a video conference, communicating with a video conferencing service, presenting video conference data to a video conference participant, etc., may be performed by other devices, as well. For instance, a personal device such as a laptop computer, desktop computer, mobile phone, tablet, or the like, may be configured to function as an endpoint for a video conference (e.g., through execution of a video conferencing client application), in a manner similar to that of collaboration endpoint 302.

Figure 4:
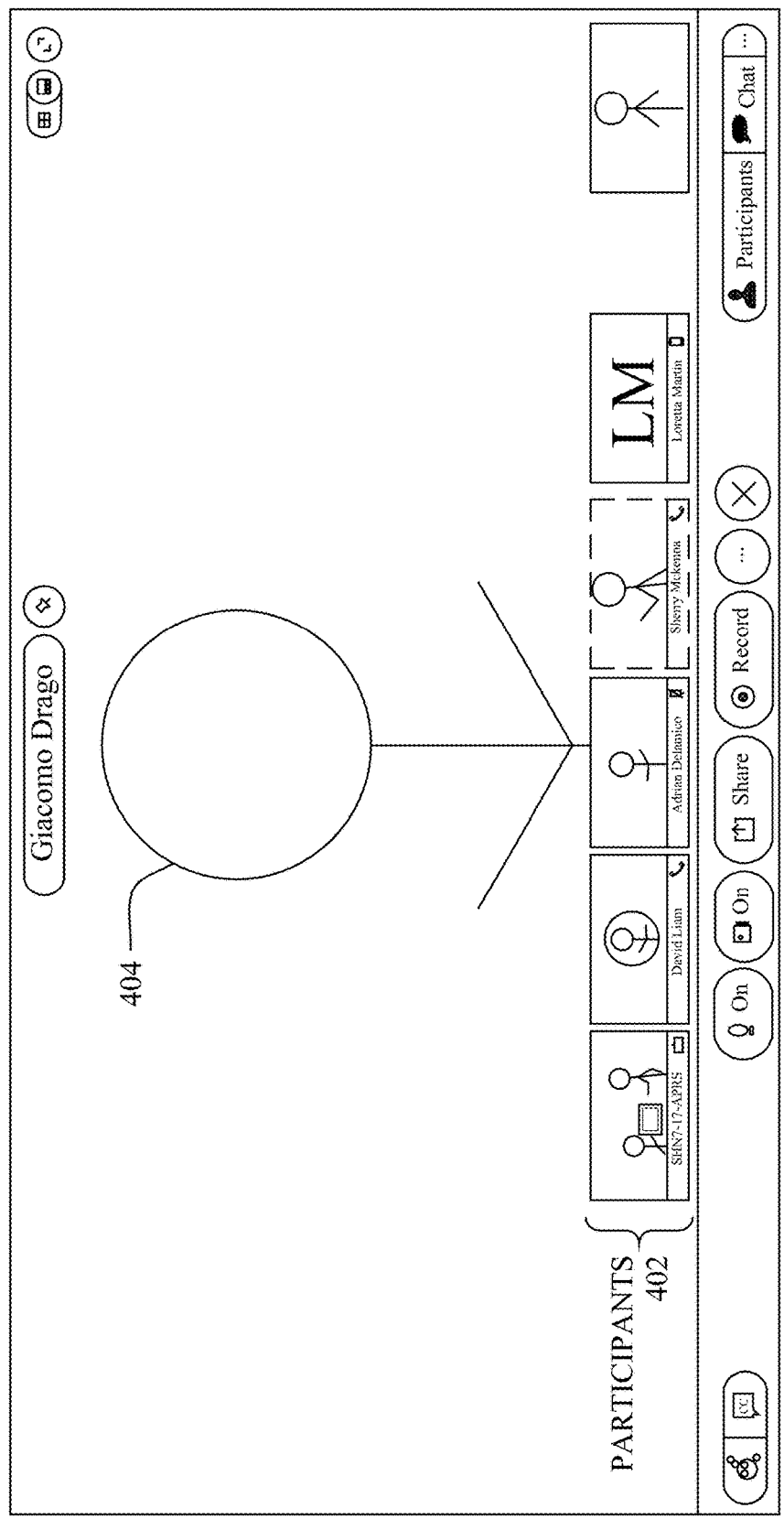
FIG. 4 illustrates an example display of a video conference.

FIG. 4 illustrates an example display of a video conference 400, according to various embodiments. As shown, video for different participants 402 may be presented in conjunction with that of a presenter 404. For instance, video data for each of participants 402 (e.g., video captured by each of their respective cameras) may be presented along the bottom of the displayed conference, along a side of the displayed conference, or the like. Typically, the host or presenter of the video conference may be displayed in a prominent location on screen, with their video appearing much larger than that of participants 402.

As noted above, users of a video conference typically have limited control over their video streams during a video conference, which can create additional overhead for the system. For instance, the video conferencing service may allow participants 402 and/or presenter 404 to apply a masking to their video feeds, to replace their physical backgrounds with different images (e.g., a participant working from home may instead appear to the other participants as being located on the beach). In other cases, presenter 404 may opt to share their screen with the other participants 402, in lieu of their camera feed. However, this is typically done in a binary manner whereby either presenter 404 or their electronic content is shown to the other participants 402 of the video conference at any given time.

Transport Mechanisms for Video Stream Merging with Overlapping Video

The techniques herein allow for the automatic merging of video streams into an overlapping video (e.g., to produce a visual effect of a presenter being shown in combination with their shared content, etc.). In some aspects, the relative location of one video may be signaled in it video stream for overlapping with a video of another video stream. Further aspects of the techniques herein introduce mechanisms whereby the sender of a video stream may also send segmentation mask data to a receiver, thereby allowing that receiver to perform background replacement. The segmentation mask data can be included either as data embedded into the video stream itself or sent via its own video stream.

Specifically, according to one or more embodiments of the disclosure as described in detail below, a device receives a first video stream of a video conference. The device receives a second video stream of the video conference. The second video stream includes an indicated location for video of the second video stream relative to video of the first video stream. The device merges the first video stream and the second video stream into an overlapped video having the video of the second video stream located at the indicated location relative to the video of the first video stream. The device provides the overlapped video for display.

Illustratively, the techniques described herein may be performed by hardware, software, and/or firmware, such as in accordance with video conferencing process 248, which may include computer executable instructions executed by the processor 220 (or independent processor of interfaces 210) to perform functions relating to the techniques described herein.

Figure 5:
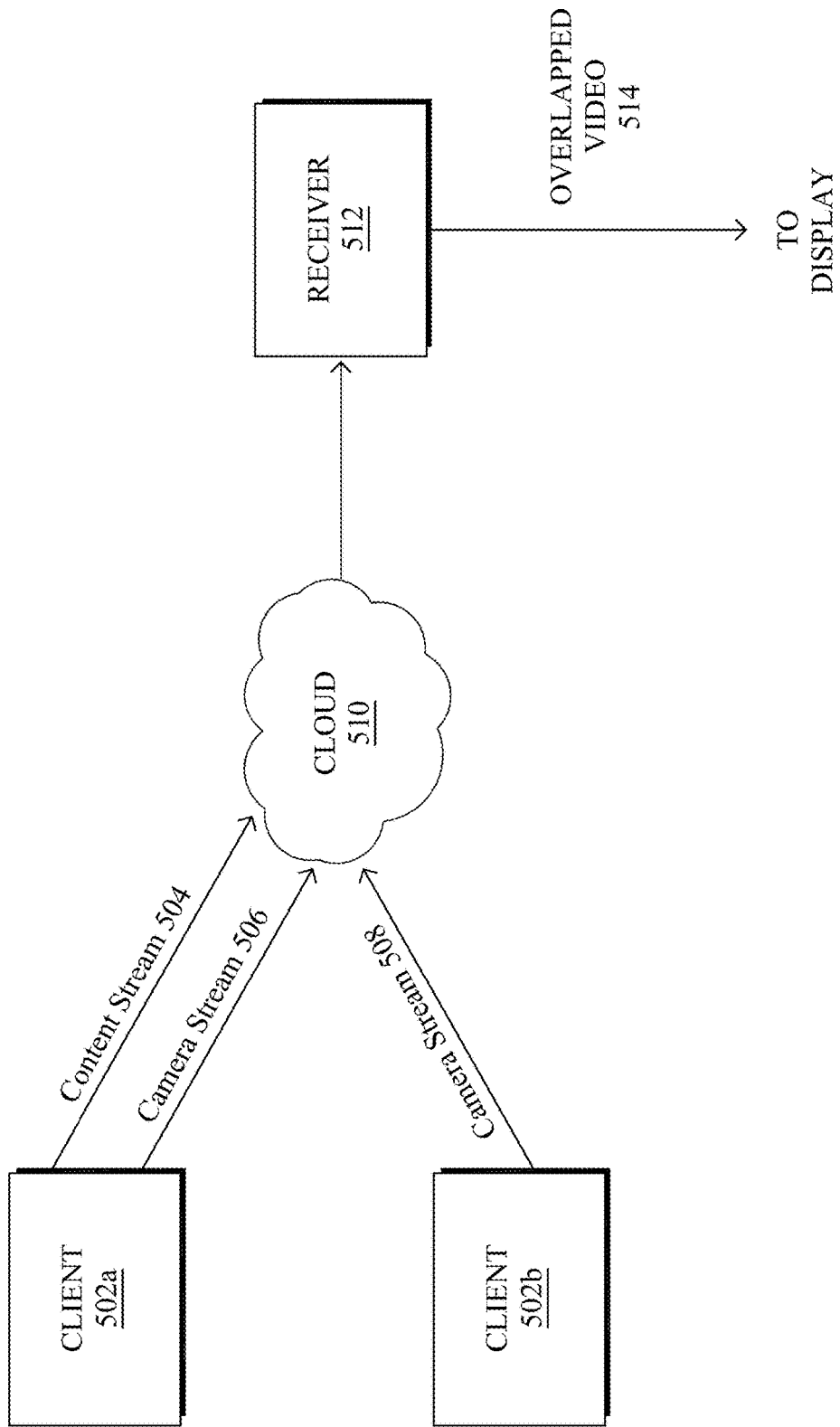
FIG. 5 illustrates an example architecture for merging video streams.

Operationally, FIG. 5 illustrates an example architecture 500 for merging video streams, according to various embodiments. As shown, architecture 500 may include any or all of the following components: a first client 502a, a second client 502b, a cloud 510, and/or a receiver 512, that operate in conjunction with one another to form a video conference system.

For purposes of illustration, assume that client 502a is operated by a presenter of a video conference, that client 502b is operated by a participant of the video conference, and that a receiver 512 is operated by another participant of the video conference or is in communication with an endpoint device operated by that participant. Accordingly, client 502a may generate and send one or more video streams to cloud 510 for delivery to receiver 512, such as a content stream 504 and/or a camera stream 506.

In general, content stream 504 may include video captured by a desktop sharing function executed by client 502a. For instance, content stream 504 may include a video of the entire screen of the user of client 502a or a portion thereof, such as a designated area of their screen, a particular application shown on screen, or the like. Similarly, camera stream 506 may include video captured by a camera of client 502a, such as a video of the user of client 502a. Similarly, client 502b may provide camera stream 508 that includes video captured by a camera of client 502b.

As would be appreciated, the specific operations of architecture 500 may vary at any given time. For instance, the user of client 502a may stop sharing content via the video conference, the user of client 502b may turn their camera off and only contribute audio to the video conference, etc.

According to various embodiments, any of video streams 504-508 may include an indicated location for its video relative to video of another one of those video streams. For instance, consider the case in which the presenter of the video conference operating client 502a wishes to simultaneously present desktop content as well as video of themselves (e.g., the videos present in steams 504-506), in an overlapping manner. For instance, FIG. 6 illustrates an example display 600 of a video conference with overlapping video.

Figure 6:
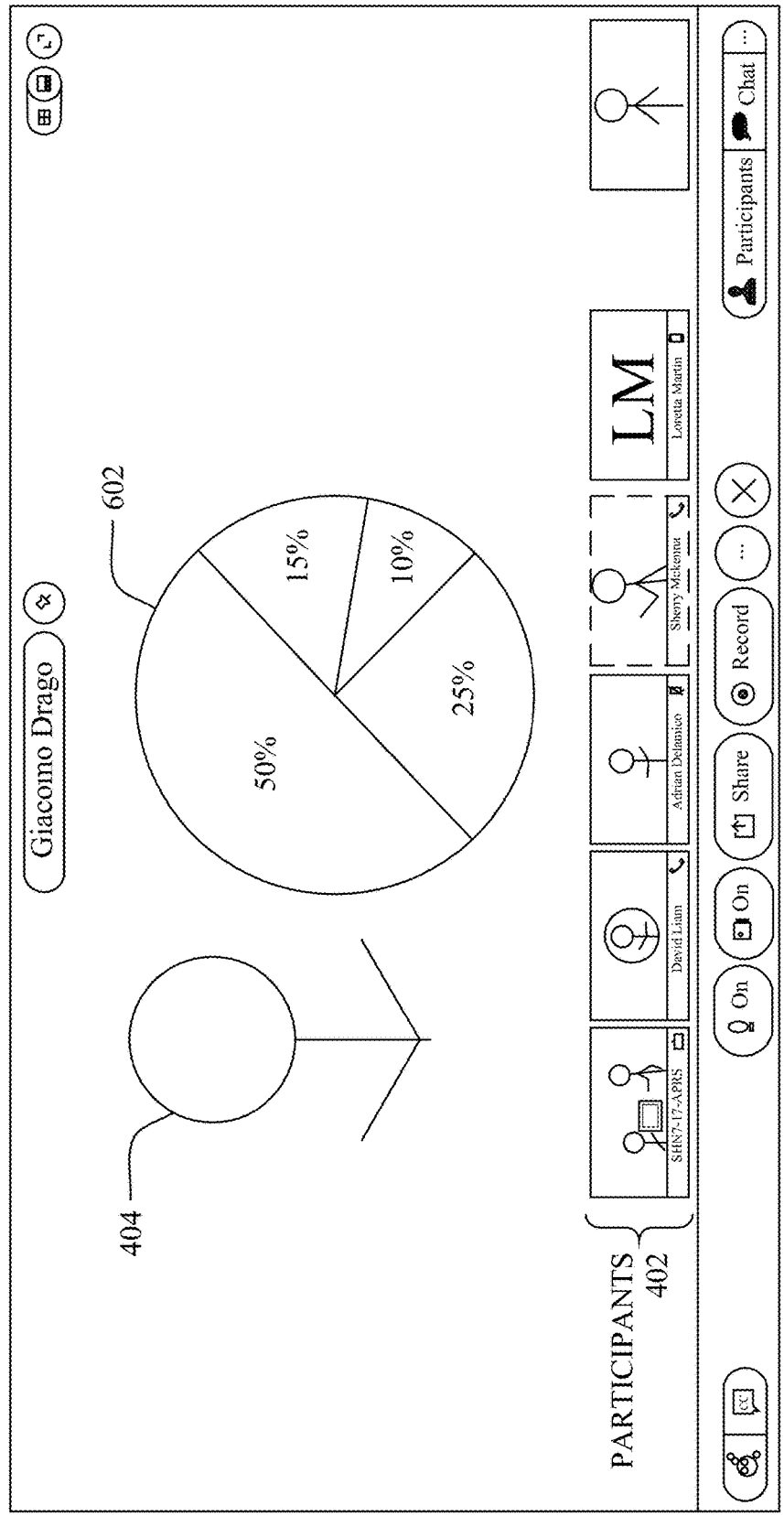
FIG. 6 illustrates an example display of a video conference with overlapping video.

As shown in FIG. 6, the video of both presenter 404 as well as the video of their shared content 602 may be merged in an overlapping manner, so as to provide a unified video to participants of the video conference. In some instance, for example, this may entail replacing the background of the video of presenter 404 with the video of their shared content 602. This allows the presenter to appear to interact directly with the content, such as by pointing to the content or the like.

Referring again to FIG. 5, receiver 512 may form overlapped video 514 from the videos of streams 504-506 and provide it to an electronic display, according to the location indicated in one of those streams relative to the other. For instance, in various embodiments, camera stream 506 may include any of the following:

A predefined identifier that indicates where the video of camera stream 506 should be placed relative to the video of content stream 504.

A width and/or height value that indicates where the video of camera stream 506 should be placed relative to the video of content stream 504.

An offset value that indicates where the video of camera stream 506 should be placed relative to the video of content stream 504.

Note that the techniques herein may also support indication of a location that extends outside a boundary of X, since there are some compositions that may benefit from this. Further, in some embodiments, a video stream may also include any or all of the following labels:

a layering preference label—for instance, such a label may aid receiver 512 in layering different foreground objects that overlap onto a common background.

a label to indicate foreground and base streams

The above indications may be conveyed in various ways, depending on the protocols used for video streams 504-506. For instance, assume that video streams 504-506 are H.264 video streams. In such a case, in various embodiments, the relative location information for the overlapping action may be conveyed in-band as part of a H.264 Supplemental Enhancement Information (SEI) payload. More specifically, the H.264 SEI header may be set by client 502a using a namespace-based universally unique identifier (UUID), which can be generated using Python as follows:

import uuid
uuid.uuid3(uuid.NAMESPACE_DNS, "SEI_RECT")

This results in:
const uint8_t g_kuiUuidRect[SEI_UDU_UUID_LEN]= {0xe3, 0xb8, 0xcc, 0x71, 0xa3, 0xaa, 0x31, 0x14, 0x9f, 0xe7, 0x64, 0x17, 0xa7, 0xc4, 0x7d, 0xcb};

Below illustrates an example such UUID:
static constexpr u8 camera_metadata_uuid[SEI_UD-U_UUID_LEN]={0x69, 0x7b, 0x16, 0x07, 0x2e, 0x41, 0x45, 0xcc, 0x98, 0x90, 0xfb, 0xbf, 0x1c, 0xad, 0xa7, 0xf6};

In terms of the SEI payload, the following syntax may be used:
version: 8 bit protocol version 0x01-0xff—a message received with version !=current version will be ignored.
MsgType: 8 bit message type, 0x11=RectInfoOnly, 0x12=MaskInfoOnly, 0x13=RectAndMaskInfo, 0x10=StopImmersive
Length: Length in bytes (0x0000-0xffff) of the message specific payload (excluding the header)
  if (MsgType!=StopImmersive), Length must NOT be 0.
  if (MsgType==StopImmersive), Length must be 0.
The payload information may thus be as follows:

TABLE 1

|  | C | Descriptor |
|---|---|---|
| immersive_rect( payloadSize ) |  |  |
| immersive_rect_id | 5 | u(8) |
| original_sharing_encoded_video_width | 5 | u(16) |
| original_sharing_encoded_video_height | 5 | u(16) |
| immersive_rect_updata | 5 | u(1) |
| if(immersive_rect_updata){ |  |  |
| immersive_rect_left_offset | 5 | u(16) |
| immersive_rect_right_offset | 5 | u(16) |
| immersive_rect_top_offset | 5 | u(16) |
| immersive_rect_bottom_offset} | 5 | u(16) | original_sharing_encoded_video_width/Height: this may be needed when there is transcoding in the route. This is especially true when camera-video and screen-video may be using transcoding differently. For example, transcoding may only be applied for sharing, for receivers only capable to receive lower-resolution resolution. Now, say that original_sharing_encoded_video is 4K, and the transcoding is changing to 1080p sharing. In such a case, the SEI embedded in the presenter camera video will be unchanged.

offset: on the coordinates of the sharing_encoded_video

In further embodiments, any or all of the above information could also be included in an AV1 Open Bitstream Unit (OBU). As would be appreciated, the relative location information could also be conveyed in other manners, depending on the specific protocol(s) used.

According to further embodiments, the techniques herein also introduce mechanisms for the sender of a video stream to perform segmentation locally and send the resulting alpha blending information/segmentation mask information for the video, in conjunction with the video stream. This allows for the receiver, such as receiver 512, to perform background replacement with respect to the video stream.

For instance, in FIG. 5, assume that the user of client 502b wishes to replace their background during the video conference to appear located on the beach, instead of their home office. In such a case, in some embodiments, client 502b may perform segmentation on the captured video of camera stream 508, to isolate the image of the user from that of their background. In turn, client 502b may include this segmentation data in camera stream 508, thereby allowing receiver 512 to perform the background replacement functions, in some embodiments.

For instance, any or all of the following segmentation mask information may be included in a sent video stream. Such information may include any or all of the following:
  mask width and height indicators, e.g., flag to indicate whether the mask using the same width and height as current stream, and/or absolute width and height info
  mask bitdepth info, e.g., mask can be binary (0/1 only or monotone with some given bitdepth)
  mask compression type
  bounding box info presented or not flag, and bounding box info, which indicates that the mask only has non-zero values within a certain rectangular region of mask resolution. So the mask, compressed from the mask payload data, will only fill into the bounding_box (if presented) and all the other area of the mask will be zero.
  mask payload data, compressed or uncompressed.

This information may likewise be conveyed via an embedded H.264 SEI, AV1 OBU, or the like. For instance, in the H.264 case, the following may be included in an SEI:

TABLE 2

|  | C | Descriptor |
|---|---|---|
| immersive_mask( payloadSize ) |  |  |
| immersive_mask_resolution_skip_flag | 5 | b(1) |
| immersive_mask_bounding_box_flag | 5 | b(1) |
| immersive_mask_compression_type | 5 | u(6) |
| if ( immersive_mask_resolution_skip_flag == 0 ){ |  |  |
| immersive_mask_width | 5 | u(16) |
| immersive_mask_height} | 5 | u(16) |
| if ( immersive_mask_bounding_box_flag == 1 ){ |  |  |
| bounding_box_x | 5 | u(16) |
| bounding_box_y | 5 | u(16) |
| bounding_box_xsize | 5 | u(16) |
| bounding_box_ysize} | 5 | u(16) |
| if ( immersive_mask_compression_type != BI_LEVEL_TYPES ){ |  |  |
| immersive_mask_bitdepth} | 5 | u(8) |
| for( i = 1; i < payloadSize; i++ ){ |  |  |
| immersive_mask_compression_payload_byte} | 5 | b(8) | immersive_mask_resolution_skip_flag:
  When immersive_mask_resolution_skip_flag==1, the mask resolution is the same as the decoded main stream AND it MAY be overwritten by the resolution indicated in the mask payload section. When immersive_mask_resolution_skip_flag==0, mask resolution MUST be indicated by immersive_mask_width/immersive_mask_height and cannot be overwritten by the resolution indicated m the mask payload section.
immersive_mask_bounding_box:
  This may be relative to the mask itself and essentially just says that the mask only has non-zero values within a certain rectangular region of the presenter video frame. So, the compressed mask will only fill into the bounding_box (if presented) and all the other area of the mask will be zero. As would be appreciated, this can efficiently "compress" the mask area out-side of the bounding-box, so that the compression efficiency of the whole mask may be higher it may make alpha-blending faster at receiver side. since it will be "crop-and-blend," rather than alpha-blend the entire presenter frame (which may be scaled up to as large as the entire share frame).

BI_LEVEL_TYPES: when immersive_mask_compression_type is one of BI_LEVEL_TYPES, it means the mask will only have 0,1 value. BI_LEVEL_TYPES includes these: {jbig2, jbig2_generic_region_big_endian}.

immersive_mask_compression_type can be one of the following:
  jbig2
  jbig2_generic_region_concise_compression: when immersive_mask_compression_type=jbig2_generic_region_conci se_compression, the mask will be compressed using the partial syntax of jbig2_generic_region.

In various embodiments, there may be two compression syntaxes used to control the compression for the mask data: jbig2_generic_region_concise_compression and jbig2_generic_region_concise_compression_payload. Here, when
  compression_type==jbig2_generic_region_concise_compression, the syntax includes the two sections:
    {jbig2_generic_region_concise_header
    jbig2_generic_region_compressed_payload}
  when
    compression_type==jbig2_generic_region_concise_compression_payload, thesyntax only includes the jbig2_generic_region_compressed_payload section.

The syntax for jbig2_generic_region_concise_header is as follows:

```
struct jbig2_generic_region_concise_header {
#ifndef _BIG_ENDIAN
  u8 mmr : 1;
  u8 gbtemplate : 2;
  u8 tpgdon : 1;
  u8 reserved : 4;
#else
  u8 reserved : 4;
  u8 tpgdon : 1;
  u8 gbtemplate : 2;
  u8 mmr : 1;
#endif // generic region segment here. You may not need to write all 8 bytes here.
// If the template is 1..3 only the first two are needed.
``` signed char a1x, a1y, a2x, a2y, a3x, a3y, a4x, a4y; } PACKED;

The decoder and encoder behaviors are, therefore, as follows:
  when decoding jbig2_generic_region_concise_compression_payload type, the receiver SHOULD use info the last-received jbig2 generic_region_concise_header. If no last-received jbig2_generic_region_concise_header is available, all elements in jbig2_generic_region_concise_header SHOULD be considered as default value 0.
  encoder MAY only encode jbig2_generic_region_concise_compression message at sequence starts, and use jbig2_generic_concise_compression_payload message for later messages.

Consequently, the receiver, such as receiver 512 will have all of the mask data as part of the incoming video stream, to perform background replacement. This can be done, for instance, with either or both of camera stream 506 and camera stream 508, to replace the backgrounds of their respective videos (e.g., to only depict the users and not their backgrounds).

Figure 7:
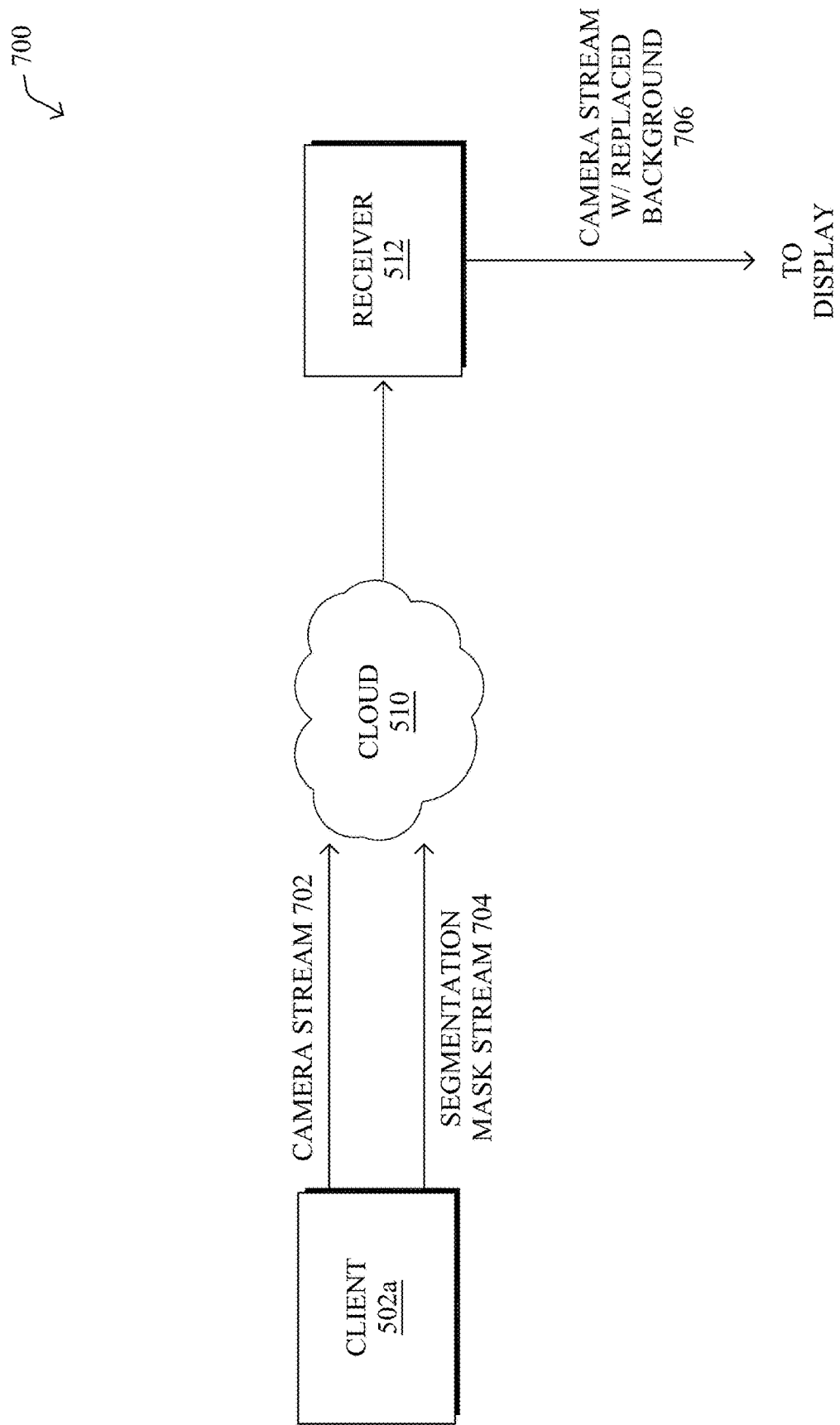
FIG. 7 illustrates an example architecture for transmitting segmentation mask data.

In an alternate embodiment, FIG. 7 illustrates an example architecture 700 for transmitting segmentation mask data, according to various embodiments. As shown, architecture 700 may include the various components of architecture 500, such as a client 502a that sends video streams to a receiver 512 via cloud 510. Here, again assume that the user of client 502a wishes to replace their depicted background from their camera feed with a special background.

According to various embodiments, client 502a may send its camera stream 702 to receiver 512, which includes the video captured by the camera of client 502a. In addition, client 502a may perform segmentation on that video, to form segmentation mask data. In turn, rather than including the mask data directly as part of its camera stream 702, it may instead send the generated segmentation mask data to receiver 512 in a second video stream, segmentation mask stream 704.

On receipt of camera stream 702 and segmentation mask stream 704, receiver 512 may perform the background replacement task by using the mask data of segmentation mask stream 704 to replace the background of the video of camera stream 702. In turn, receiver 512 may then provide the resulting video 706 for display that includes the camera stream video with its background having been replaced. As would be appreciated, this approach is in contrast to many traditional approaches whereby the sender (e.g., client 502a) is the one that performs the background replacement).

Figure 8:
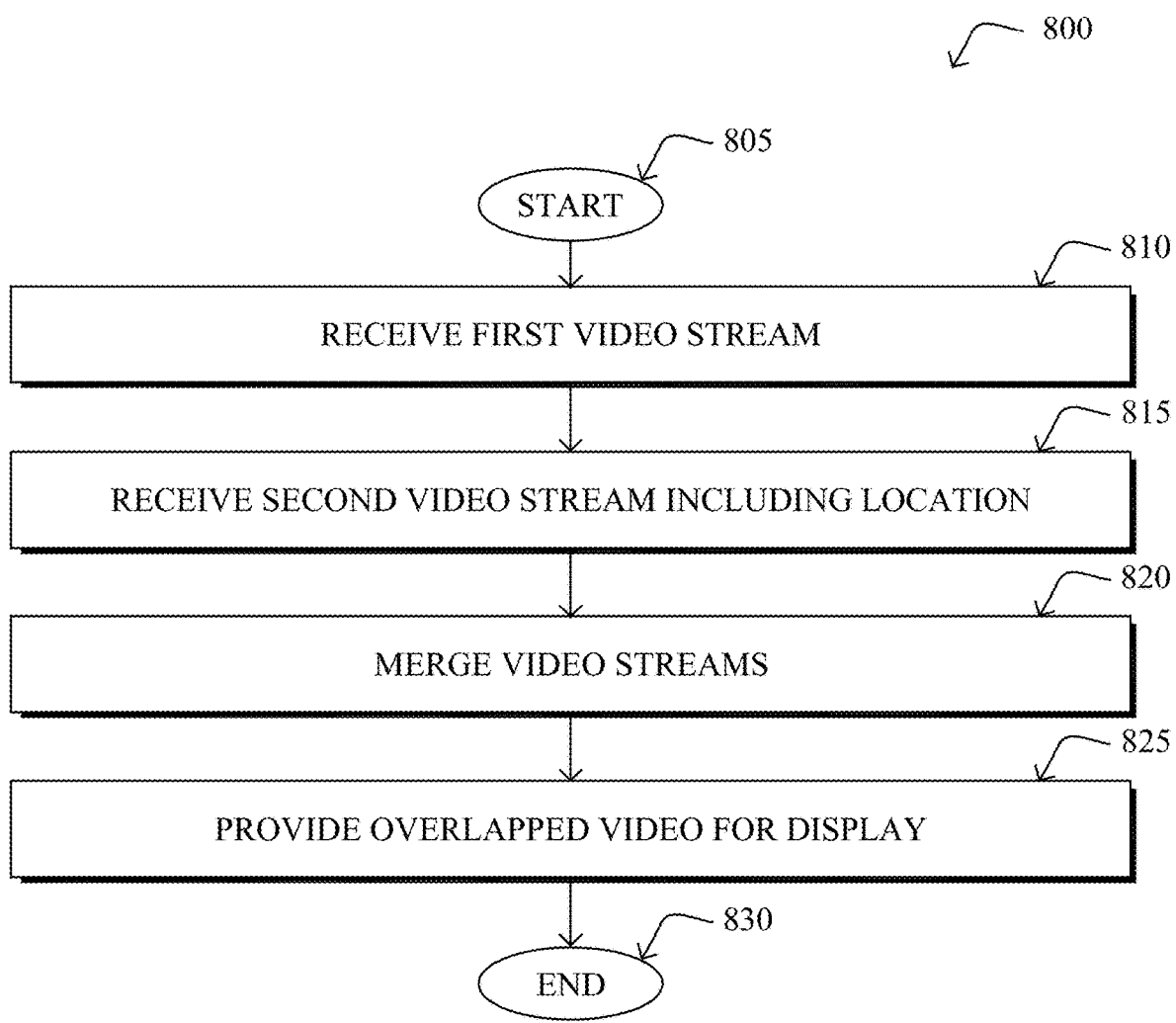
FIG. 8 illustrates an example simplified procedure for providing overlapping video for display.

FIG. 8 illustrates an example simplified procedure 800 (e.g., a method) for providing overlapped video for display, in accordance with one or more embodiments described herein. For example, a non-generic, specifically configured device (e.g., device 200) of a video conferencing system (e.g., a supervisory device, a collaboration endpoint, etc.) may perform procedure 800 by executing stored instructions (e.g., video conferencing process 248). The procedure 800 may start at step 805, and continues to step 810, where, as described in greater detail above, the device may receive a first video stream of a video conference. For instance, the first video stream may include video captured by a camera of an endpoint, screen share video data captured by a desktop sharing function, or the like.

At step 815, as detailed above, the device may receive a second video stream of the video conference. In various embodiments, the second video stream may include an indicated location for video of the second video stream relative to video of the first video stream. For instance, the second video stream may also include video captured by a camera of an endpoint, screen share data, or the like. In various embodiments, the second video stream may also include a predefined location identifier for a relative location of the video of the first stream, a location offset value relative to the video of the first stream, a width and/or height value relative of the video of the first stream, or other identifier that specifies where the video of the second video stream should overlap that of the video of the first video stream. In various embodiments, the indicated location may be included in an H.264 SEI payload, an AV1 OBU, or the like.

At step 820, the device may merge the first video stream and the second video stream into an overlapped video having video of the second video stream located at the indicated location relative to the video of the first video stream, as described in greater detail above. For instance, video of a presenter may be shown overlapped with the desktop content that they are sharing. In some embodiments, the second video stream may also include mask data that segments a foreground of the video of the second video stream from a background of that video. This can be used, for instance, to overlap the foreground of the video on top of the video of the first video stream. In other embodiments, the device may receive such mask data via a third video stream, instead of embedded and/or compressed within the second video stream.

At step 825, as detailed above, the device may provide the overlapped video for display. For instance, the device may send the overlapped video to a local display or send the overlapped video to one or more remote endpoints/displays. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce techniques that allow for the merging of video streams of a video conference by indicating where video of one video stream should be located relative to that of another. In further aspects, the techniques herein also support receiver-side background replacement whereby segmentation is performed by the sender of a video stream and mask data transmitted in conjunction with the original video, either within the same stream (e.g., in a compressed manner) or as its own stream.

While there have been shown and described illustrative embodiments that provide for merging video streams in an overlapping manner, it is to be understood that various other adaptations and modifications may be made within the spirit and scope of the embodiments herein. For instance, while the techniques herein are described primarily with respect to an enclosed meeting room, such as a conference room, the techniques herein are equally applicable to other locations, as well, such as auditoriums, outdoor locations, and the like. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a device, a first video stream of a video conference;
receiving, at the device, a second video stream of the video conference, wherein the second video stream includes an indicated location for video of the second video stream relative to video of the first video stream, and wherein the device receives the first video stream and the second video stream from the same client of the video conference;
merging, by the device, the first video stream and the second video stream into an overlapped video having the video of the second video stream located at the indicated location relative to the video of the first video stream; and
providing, by the device, the overlapped video for display.

2. The method as in claim 1, wherein indicated location comprises a predefined location identifier or a location offset value.

3. The method as in claim 1, wherein the indicated location comprises a width or height value relative to the video of the first video stream.

4. The method as in claim 1, wherein the video of the second video stream comprises video data captured by a camera, and wherein the video of the first video stream comprises video data captured by a desktop sharing function.

5. The method as in claim 1, wherein the indicated location is included in a H.264 Supplemental Enhancement Information (SEI) payload of the second video stream or in an AV1 Open Bitstream Unit (OBU) of the second video stream.

6. The method as in claim 1, wherein the second video stream further includes mask data that segments a foreground of the video of the second video stream from a background of the video of the second video stream.

7. The method as in claim 6, further comprising:
using the mask data to replace the background of the video of the second video stream merged into the overlapped video.

8. The method as in claim 6, wherein the mask data is compressed according to a compression syntax that specifies compression of a generic region of the mask data or a partial generic region of the mask data.

9. The method as in claim 1, further comprising:
receiving, at the device, a third video stream that includes mask data that segments a foreground of the video of the second video stream from a background of the video of the second video stream.

10. An apparatus, comprising:
one or more network interfaces;
a processor coupled to the one or more network interfaces and configured to execute one or more processes; and
a memory configured to store a process that is executable by the processor, the process when executed configured to:
receive a first video stream of a video conference;
receive a second video stream of the video conference, wherein the second video stream includes an indicated location for video of the second video stream relative to video of the first video stream, and wherein the device receives the first video stream and the second video stream from the same client of the video conference;

merge the first video stream and the second video stream into an overlapped video having the video of the second video stream located at the indicated location relative to the video of the first video stream; and provide the overlapped video for display.

11. The apparatus as in claim 10, wherein indicated location comprises a predefined location identifier or a location offset value.

12. The apparatus as in claim 10, wherein the indicated location comprises a width or height value relative to the video of the first video stream.

13. The apparatus as in claim 10, wherein the video of the second video stream comprises video data captured by a camera, and wherein the video of the first video stream comprises video data captured by a desktop sharing function.

14. The apparatus as in claim 10, wherein the indicated location is included in a H.264 Supplemental Enhancement Information (SEI) payload of the second video stream or in an AV1 Open Bitstream Unit (OBU) of the second video stream.

15. The apparatus as in claim 10, wherein the second video stream further includes mask data that segments a foreground of the video of the second video stream from a background of the video of the second video stream.

16. The apparatus as in claim 15, wherein the process when executed is further configured to:

use the mask data to replace the background of the video of the second video stream merged into the overlapped video.

17. The apparatus as in claim 15, wherein the mask data is compressed according to a compression syntax that specifies compression of a generic region of the mask data or a partial generic region of the mask data.

18. A computer-readable medium that is tangible, non-transitory, and stores program instructions that cause a device of a video conferencing system to execute a process comprising:

receiving, at the device, a first video stream of a video conference;

receiving, at the device, a second video stream of the video conference, wherein the second video stream includes an indicated location for video of the second video stream relative to video of the first video stream, and wherein the device receives the first video stream and the second video stream from the same client of the video conference;

merging, by the device, the first video stream and the second video stream into an overlapped video having the video of the second video stream located at the indicated location relative to the video of the first video stream; and providing, by the device, the overlapped video for display.

* * * * *

UNITED STATES PATENT AND TRADEMARK OFFICE
CERTIFICATE OF CORRECTION

PATENT NO. : 11,765,311 B2
APPLICATION NO. : 17/389518
DATED : September 19, 2023
INVENTOR(S) : Jochen Christof Schirdewahn et al.

Page 1 of 1

It is certified that error appears in the above-identified patent and that said Letters Patent is hereby corrected as shown below:

In the Specification

Column 10, Line 18, please amend as shown:
whether the mask is using the same width and height as Column 11, Line 21, please amend as shown:
ric_region_concise_compression, the mask will be Signed and Sealed this
Twenty-first Day of November, 2023

Katherine Kelly Vidal
*Director of the United States Patent and Trademark Office*